March 26, 1935.    H. E. ALTGELT    1,995,955
LISTER CULTIVATOR
Filed March 31, 1932    2 Sheets-Sheet 1
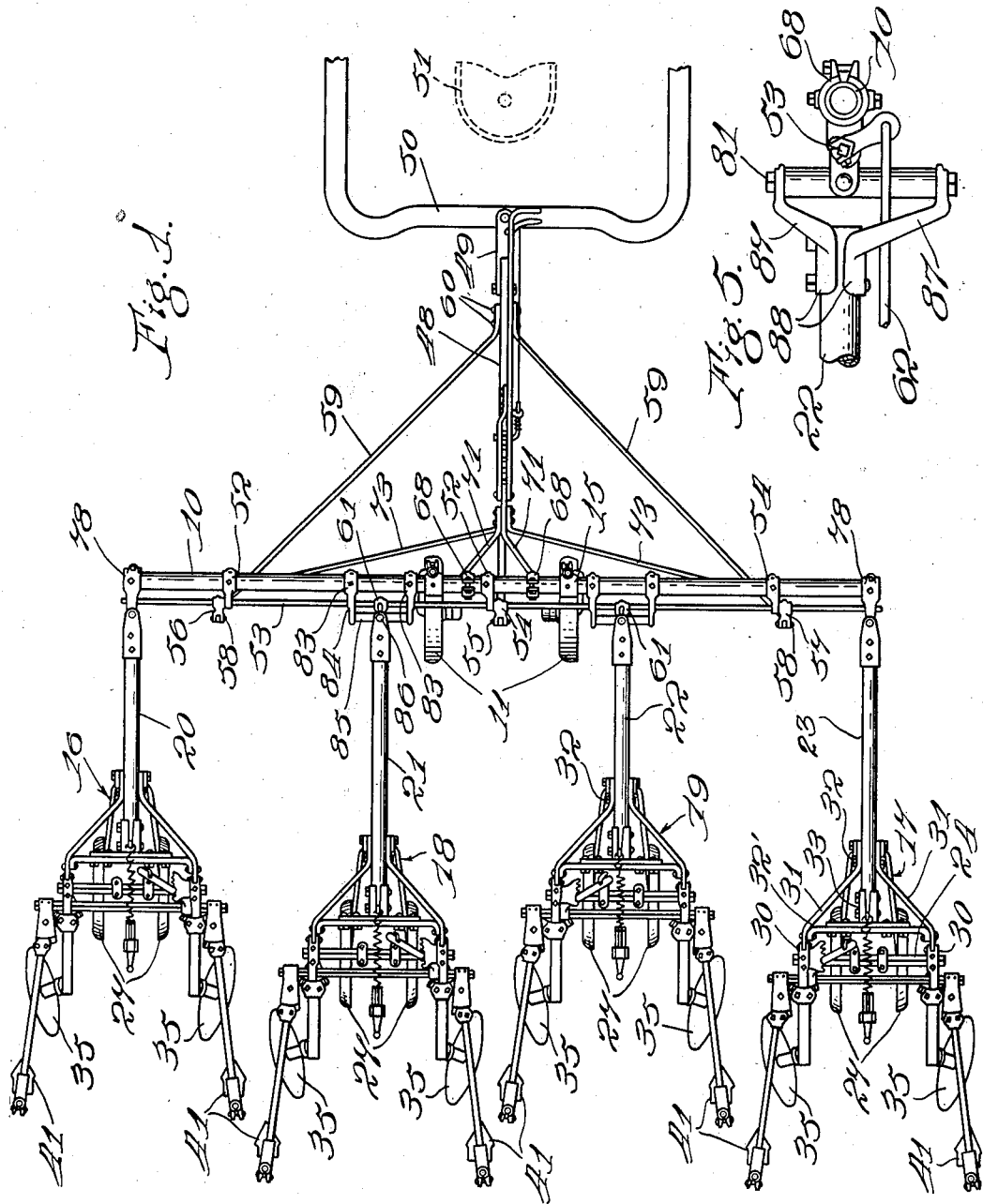

March 26, 1935.   H. E. ALTGELT   1,995,955
LISTER CULTIVATOR
Filed March 31, 1932    2 Sheets-Sheet 2
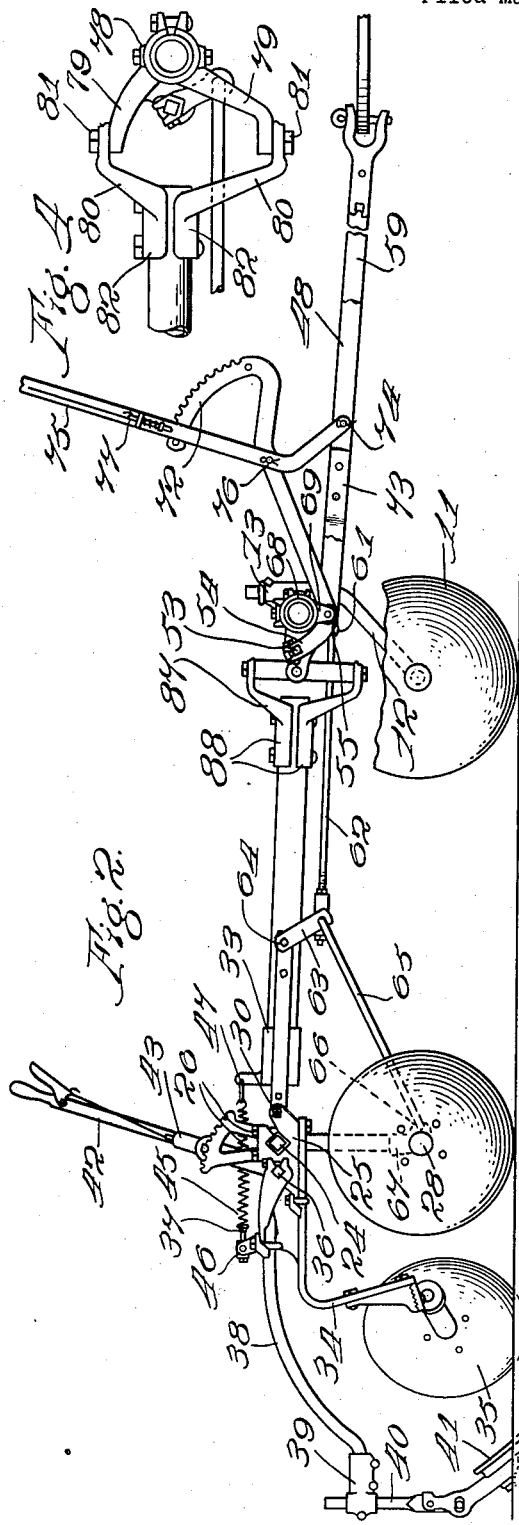
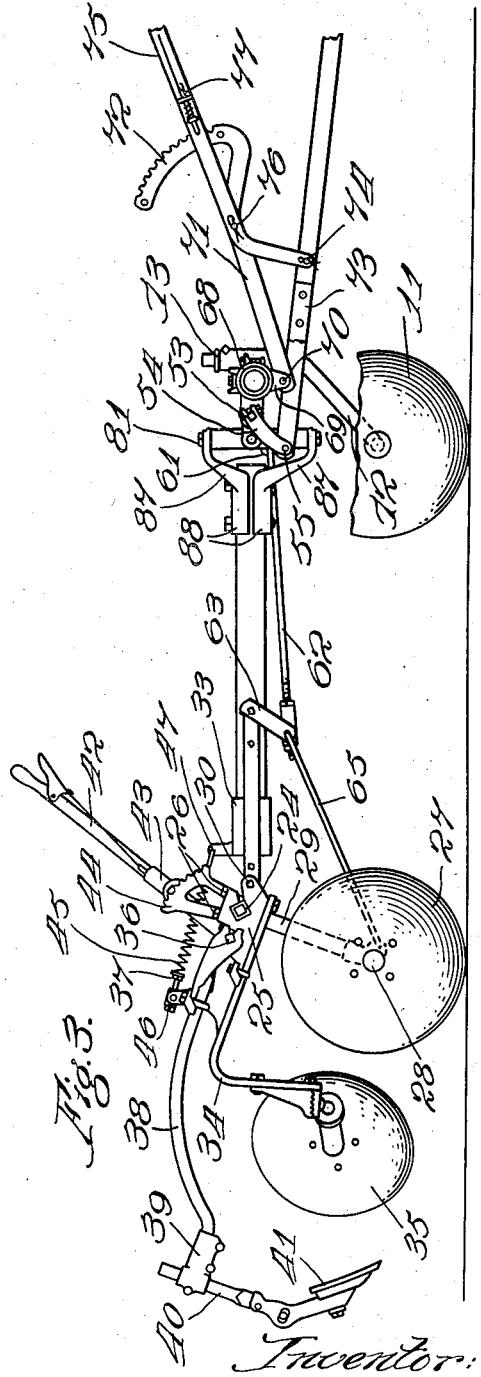
Inventor:
Herman E. Altgelt.
By John P. Smith
Atty.

Patented Mar. 26, 1935

1,995,955

UNITED STATES PATENT OFFICE 1,995,955

LISTER CULTIVATOR

Herman E. Altgelt, South Bend, Ind., assignor to Oliver Farm Equipment Company, a corporation of Delaware Application March 31, 1932, Serial No. 602,198

18 Claims. (Cl. 97—143)

This invention relates generally to a lister cultivator, but more particularly to a tractor drawn cultivator in which a plurality of units or gangs will automatically guide themselves along the rows for cultivating row crops.

One of the objects of the present invention is to provide a novel and improved form of lister cultivator having a plurality of units operatively connected together and in which all of the units are suspended from a three point frame construction.

Another object of the invention is to provide a novel and improved lister cultivator in which the outside units together with the front portion of the cultivator proper forms a three point suspension for the cultivator while the intermediate units are floatingly connected to the front frame structure.

A still further object of the invention is to provide a novel and improved lister cultivator in which a plurality of units or gang frames are pivotally connected to the front frame structure so as to permit lateral movement with respect to each other, while the outer units are incapable of vertical movement with respect to the front frame, and the intermediate units are capable of universal movement with respect to the front frame.

A still further object of the invention is to provide a novel and improved form of lister cultivator in which the adjacent units are staggered or off-set with respect to each other so as to allow sufficient clearance for turning to the right or to the left at the end of the field.

A still further object of the invention is to provide a novel and improved lister cultivator in which a plurality of cultivator units or gangs may be raised or lowered by means of a lever from the operator's seat on the tractor and in which the draft of the tractor may be utilized in combination with manipulating the lever for forcing and depressing all of the units to their proper depth into the ground.

These, and other objects are accomplished by providing a construction and arrangement of the various parts in the manner hereinafter described and particularly pointed out in the appended claims.

Referring to the drawings, Fig. 1 is a top plan view showing one embodiment of my improved lister cultivator.

Fig. 2 is a side elevational view of one of the center units showing the same in its lowered or operative position for cultivating the ground.

Fig. 3 is a similar side elevational view in which the cultivator units are raised to their inoperative of transporting position.

Fig. 4 is a fragmentary detailed view showing the manner in which the outside units are connected to the front supporting frame, and Fig. 5 is a detailed view showing the universal joint or connection of the intermediate units with the front frame structure.

In illustrating one form of my invention I have shown the same as comprising a front main frame member 10 which is preferably in the form of a tube or pipe which in turn is supported on two spaced apart truck or suporting wheels 11. These wheels are located in substantially the center of the pipe, so as to straddle the middle ridge or hill. These wheels 11 are journalled on crank axles 12 which have vertically extending portions rigidly secured by means of keys and clamps to vertically extending barrel portions 13 formed on brackets 15 which in turn are rigidly secured to the pipe 10. These brackets are adjustable longitudinally of the pipe 10 so as to vary the spacing between these two wheels if so desired. It will also be noted that the vertical portion of the axle shanks 12 may be vertically adjusted in the bearing portion 13 of the bracket 15 so as to adjust the height of the front frame as well as the axle tongue of each of the units with respect to the ground. However, it will be understood that the front wheels 11 are incapable of a swinging or lateral movement as they are rigidly connected to the transverse frame member 10. Attached to the front frame in a manner hereinafter described are outside cultivating units 16 and 17 and inside cultivating units 18 and 19. These units are connected by means of tubular tongues or poles 20, 21, 22 and 23 to the front frame. It will be noted that the poles 20 and 22 are of the same length and are relatively shorter than the poles 21 and 23 so as to alternately space the units in staggered relation with respect to each other, to thereby provide sufficient clearance between the units when the tractor is turned to the right or to the left at the end of the field.

The cultivating mechanism embodied in each of these units is identical in every respect and a description of one will suffice for the other. Each of these units comprises a transverse tubular pipe or supplemental frame member 24 which is square in cross section, which in turn has its opposite ends clamped in a longitudinally extending bracket 25 by means of bolts 26. Supporting the frame of each unit are two spaced apart supporting or gauge wheels 27 which in turn are journalled on axles 28. These axles 28 are secured to the frame 24 by means of vertical shanks 29. The forward ends of the brackets are pivotally connected as shown at 30, to the longitudinally extending rear portions of each of the rearwardly diverging tongue extension members 31, which in turn have their forward ends extending longitudinally and secured by means of bolts 32 to the rear ends of each of the tongues 20, 21, 22 and 23. These tongue extension members 31 are reinforced by a transverse U shaped bar 32'. Secured to the transverse bar 32' is a pole socket bracket 33 in which the rear end of the pole is fastened. Secured to the longitudinally extending frame brackets 25 are two rearwardly and downwardly extending beams 34 which support on the opposite sides of each unit cultivating disks 35. These disks are of the concavo-convex type and are adjustably secured to the lower ends of each of these beams in a manner well understood in the art. Journalled in the longitudinally extending brackets 25 in any suitable manner, is a transverse square shaft 36. Secured to the opposite ends of the shaft 36 are rearwardly extending brackets or socket members 37 in which are mounted rearwardly and outwardly diverging curved beams 38. Secured to the rear ends of the beams 38 are brackets 39, in which are adjustably mounted cultivator shanks 40 having adjustable cultivator shoes 41 attached thereto. Secured to the shaft 36, in any well known manner, is a hand operating lever generally indicated by the reference character 42, which is adapted to be manipulated and locked in various positions of adjustment by a detent mechanism 43 which operatively engages a quadrant rack 44 secured to one of the side frame members 25, as clearly shown in Figs. 1 and 3.

In order to counter balance and to facilitate the adjustment of not only the cultivating shoes 41 of each unit by the manipulation of the lever 42 with respect to the disks 35, but to also assist in the manipulation of the lever for lowering the cultivating mechanism into the ground, I have provided an extension spring 45, one end of which is connected as shown at 46 to the free end of the crank 37. The other end of the spring is connected to an ear 47 formed on the upper rear end of each of the pole sockets 33.

One of the important features of the present invention consists in a novel three point suspension of the frame, in which the outer truck wheels for each of the two outer gangs or units, together with truck wheels for the front frame form the three supporting points, and yet at the same time, these outer units are capable of flexing sideways so as to properly guide the cultivating units over the row crop, while the inner gang units are free to flex laterally as well as vertically with respect to the front frame. Another important feature of the invention is the provision of means whereby the cultivating mechanism of all the units may be raised or lowered to their working position by the manipulation of one lever which is easily operated from the operator's seat on the tractor. In this connection the draft of the tractor is used through a relatively movable draft tongue to assist the operator in manipulating the lever, and forcing the earth working tools into the ground.

These novel features consist of a relatively movable tongue generally indicated by the reference character 48, which has its forward end connected by means of a draft clevis 49 to a draft bar 50 of a tractor. The operator's seat on the tractor is diagrammatically indicated by the reference character 51. Journalled on rearwardly and spaced apart brackets 52 which are secured to the pipe 10 is a transverse shaft 53. This shaft 53 is positioned rearwardly of the pipe 10 and is coextensive therewith. Secured to the shaft 53, at a point at approximately the center thereof, is a crank 54, to the free end of which the rear end of the tongue 48 is pivotally connected as shown at 55. On the opposite sides of the center of the shaft 53, and secured thereto, are two rearwardly and downwardly extending cranks 56 and 57. Separately connected to each of these cranks, as shown at 58, are two forwardly converging braces 59, which have their forward ends extending longitudinally with and secured by means of bolts 60, to the tongue 48. Secured to the shaft 53 in longitudinal alignment with each of the cultivator unit tongues 20, 21, 22 and 23 are downwardly extending cranks 61, which have their free ends pivotally connected to the forward ends of relatively movable rods 62. The rearward ends of the rods 62 are adjustably and pivotally connected to the free ends of pivoted plates 63 which are pivoted at 64 to each side of each of the poles of each unit. The lower free ends of each of these plates are pivotally connected by means of connecting rods 65, which in turn have their rearward ends pivotally connected, as shown at 66, to brackets 67 of the cross axles 28, as clearly shown in Figs. 2 and 3 of the drawings. Secured to the main frame or pipe 10 at a point adjacent to and on the opposite sides of the longitudinal center thereof, are two brackets 68 which are provided with two downwardly extending ears 69. Pivoted to each of these ears as shown at 70, are two forwardly converging members 71, one of which extends forwardly and is provided with an arcuate sector or rack 72, while the other terminates short of the sector secured thereto for reinforcing the same. Supplemental diverging braces 73 are provided, which have their inner ends bolted to the main longitudinal tongue 48, and their outer ends secured to the diagonal draft members 59 adjacent their pivots with each of the crank arms 57. Pivotally connected to the tongue 48, as shown at 74, is a hand operating lever 75 which has an intermediate portion, as shown at 76, pivoted to the sector 72. This lever 75 is provided with the usual detent mechanism generally indicated by the reference character 77 for locking the lever in various positions of adjustment for regulating the depth penetration of the cultivating tools, or for locking the cultivating tools in raised position, as shown in Figs. 2 and 3 of the drawings.

As previously pointed out, the outside cultivating units are capable of pivotal or lateral movement with respect to the front frame, but are incapable of vertical movement. This is accomplished by providing brackets 78 which are rigidly secured to the outer ends of the main frame or pipe 10. These brackets are provided with two relatively spaced apart rearwardly extending apertured arms 79 (see Fig. 4). Pivoted to these arms 79 by means of similar arms 80 and bolts 81, are forwardly and oppositely disposed brackets 82 which in turn are bolted to each of the tongues 20 and 23 of the outside unit. Obviously this pivotal connection permits the two outside units to swing laterally with respect to the front frame, but does not permit them to move vertically with respect thereto.

As previously pointed out, the two inner units namely 18 and 19 are capable of moving laterally in either direction as well as vertically with respect to the front frame. This movement is accomplished by providing two spaced apart brackets 83 which are secured to the pipe 10, having rearwardly extending arms 84. Pivoted to these arms 84 is a universal connecting member 85 which is preferably in the form of a Maltese cross, as clearly shown in Figs. 1 and 5 of the drawings. The horizontal arms of this universal member 85 are pivoted between the brackets or arms 84 while the vertical portion of this universal member is pivoted, as shown at 86, to two spaced apart arms 87 of two oppositely disposed brackets 88 which in turn are secured to the forward ends of each of the tongues 21 and 22 respectively.
The operation of my improved lister cultivator is as follows:—
Let us assume that all the units are in their elevated, raised or transporting position, as shown in Fig. 3 of the drawings, and that the implement proper is connected to the draft bar of the tractor. If the operator is desirous of lowering the cultivator tools of all of the units to operative position in which they engage the ground or the position shown in Fig. 2, the operator manipulates the detent mechanism 77 and lever 75 from the seat 51 of the tractor, after which he may swing the lever rearwardly and simultaneously move the tractor forwardly. It will be observed that the tongue 48 together with the braces or supplemental draft members 59 will move relatively forward, that is, relatively with respect to the main frame or pipe 10, thereby moving the cranks 54 and 56 forwardly, and revolving the shaft 53 in a counter clockwise direction, as viewed from Figs. 2 and 3. This movement of the shaft 53 in a counter clockwise direction swings each of the cranks 61 forwardly and carries with it each of the connecting rods 62, which in turn, move the plates 63 forwardly and through the connections 65 to each of the truck wheels 27, will swing the truck from the position shown in Fig. 3 to the position shown in Fig. 2. At the same time it will of course be understood that the operator manipulates the lever 75, from the position shown in Fig. 3, to that shown in Fig. 2. After the lever is locked in the position shown in Fig. 2 all the units simultaneously lower the cultivating tools to ground engaging position. If the operator desires to raise the cultivating tools to inoperative position or to transporting position, the lever 75 is manipulated in the opposite direction. For this purpose the tractor may be backed to assist in this raising operation, but the implements are so balanced that the manipulation of levers operates with sufficient ease to raise all the cultivating tools out of engagement with the ground. Then too, the extension springs 45 of each unit are connected up, in a manner previously described, to counter balance a portion of the weight or force which is necessary to raise the cultivating tools from the position shown in Fig. 2 to that shown in Fig. 3.
While throughout the specification I have described my invention as applying to four units as disclosed in Fig. 1 of the drawings, it will of course, be understood that any number, i. e., from three units upwardly, may be used by changing the length of the main frame or pipe 10. It will further be seen that I have provided a simple, compact, as well as flexible lister cultivator which may be easily and readily manipulated from the operator's seat on the tractor, and which, by reason of its construction, will automatically guide the cultivating tools to follow the row crop.

In the above specification, I have described one embodiment which my invention may assume in practice, it will of course, be understood that the same is capable of modification, and that modification may be made without departing from the spirit and scope of the invention as expressed in the following claims.
What I claim as my invention and desire to secure by Letters Patent is:
1. A cultivator comprising a frame, a plurality of units connected to said frame, certain of said units movable in one plane only with respect to said frame, certain other of said units movable in various planes with respect to said frame.
2. A cultivator comprising a frame, a plurality of cultivating units connected to said frame, a relatively movable draft member connected to said frame, and means for connecting said draft member with said units for operatively moving the cultivating units into operative engagement with the ground.
3. A cultivator comprising a frame, a plurality of cultivating units connected to said frame, certain of said units together with said frame forming a three point suspension for said cultivator, certain other of said units being floatingly connected to said frame, and a single means for manually adjusting the cultivating tools of all of said units.
4. A cultivator comprising a frame, a plurality of cultivating units pivotally connected to said frame, certain of said units floatingly connected to said frame, certain other of said units movable in one plane only cultivating tools carried by each of said units, and a single manually adjustable lever for simultaneously adjusting the tools of all of said units.
5. A tractor drawn cultivator comprising a frame, a plurality of cultivating units connected to said frame, certain of said units being capable of lateral movement only with respect to said frame, certain other of said units being capable of universal movement with respect to said frame, adjustable cultivating tools carried by each of said units, and a single manually operable lever operable from the seat of the tractor for simultaneously adjusting the tools of all of said units.
6. A cultivator comprising a frame, a plurality of cultivating units connected to said frame, certain of said units being rigid in a vertical plane with respect to said frame, certain other of said units being capable of universal movement with respect to said frame, a relatively longitudinally movable draft member connected to said frame, cultivating tools carried by said units, connections operatively connecting said relatively movable draft member with said tools, and means for manually controlling the adjustment of all of said tools from said frame.
7. A cultivator comprising a frame, wheel support for said frame, a plurality of flexible cultivating units connected to said frame, certain of said units being rigid in one direction with respect to said frame, cultivating tools carried by each of said units, a relatively movable draft member connected to said frame, and operative connections connecting said draft member with said tools whereby the draft on said draft member may be utilized to simultaneously force the tools of all of said units into engagement with the ground.
8. A cultivator comprising a frame, a plurality of cultivating units connected to said frame, a wheel support for each of said units, a wheel support for said frame, means forming the connection between certain of said units and said frame for supporting the cultivator as a whole on three points, and a relatively longitudinally movable draft member connected to the forward end of said frame for controlling the adjustment of said units.

9. A cultivator comprising a frame, cultivating units pivotally connected to said frame, cultivating tools carried by each of said units, a shaft journalled in said frame, cranks secured to said shaft, a relatively movable draft member connected to said cranks, supplemental cranks secured to said shaft, and operative connections between said supplemental cranks and said tools whereby the draft of said tractor may be utilized for simultaneously forcing said tools into the ground.

10. A cultivator comprising a frame, a plurality of cultivating units pivoted to said frame, certain of said units movable in one plane only with respect to said frame, certain other of said units being universally movable with respect to said frame, cultivating tools carried by each of said units, a truck for supporting each of said units, a relatively movable draft member connecting said frame to the source of power, and movable connections connecting said draft member with said trucks whereby the draft of said tractor may be utilized for forcing said tools into the ground.

11. A cultivator comprising a main frame, a plurality of cultivating units connected to said frame, each unit including a supplemental frame, gauge wheels supporting each frame, a tongue connecting each supplemental frame with said main frame, each of said tongues being pivoted to said supplemental frames, cultivating tools carried by said supplemental frames, and a relatively movable draft member connected to said main frame and operatively connected to said supplemental frames whereby the draft on said draft member may be utilized in forcing the cultivating tools of all of the units into the ground.

12. A cultivator comprising a main frame, a plurality of cultivating units connected to said frame, each unit including a supplemental frame, gauge wheels supporting each frame, a tongue connecting each supplemental frame with said main frame, each of said tongues being pivoted to said supplemental frames, cultivating tools carried by said supplemental frames, a relatively movable draft member connected to said main frame, and operative connections between said draft member and the gauge wheels of said units whereby the draft on said draft member may be utilized in actuating all of the tools of said units into and out of engagement with the ground.

13. A cultivator comprising a main frame, a plurality of cultivating units connected to said frame, each unit including a supplemental frame, gauge wheels supporting each frame, a tongue connecting each supplemental frame with said main frame, each of said tongues being pivoted to said supplemental frames, cultivating tools carried by said supplemental frames, a relatively movable draft member connected to said main frame, operative connections between said draft member and the gauge wheels of said units whereby the draft of the tractor may be utilized in actuating all of the tools of said units into and out of engagement with the ground, and a manually operable lever mounted on said draft member and operatively connected with said main frame for locking the tools of all of said units in various positions of adjustment.

14. A cultivator comprising a frame, wheel support for said frame, a plurality of pivoted cultivating units connected to said frame, cultivating tools carried by each of said units, a relatively movable draft member connected to said frame, a sector pivoted to said draft member, a lever pivotally connected to said frame and to said sector whereby the draft on said draft member may be utilized to aid in the manipulation of said lever to simultaneously force said tools into engagement with the ground.

15. A cultivator comprising a main frame, a plurality of cultivating units connected to said frame, each unit including a supplemental frame, gauge wheels supporting each frame, a tongue connecting each supplemental frame with said main frame, each of said tongues being pivoted to said supplemental frames, cultivating tools carried by said supplemental frame, a relatively movable draft member connected to said main frame, operative connections between said draft member and said gauge wheels of said unit whereby the draft on said draft member may be utilized in actuating all of the tools of said units into and out of engagement with the ground, a sector pivoted to said first named frame, and a manually operable lever pivoted to said draft member and to said sector for locking the tools of all of said units in various positions of adjustment.

16. A cultivator comprising a frame, a plurality of cultivating units connected to said frame, a relatively movable draft member connected to said frame, means for connecting said draft member with said units for operatively moving the cultivating units into operative engagement with the ground, and a lever pivoted to said draft member and operatively connected to all of said units for locking said units in various positions of adjustment.

17. A cultivator comprising a frame, a plurality of units pivotally connected to said frame, cultivating tools carried by each of said units, a transverse rock shaft mounted on said frame, connections for connecting said units with said rock shaft, a relatively movable draft member connected to said rock shaft, and means for adjusting the relative position of said draft member with respect to said frame.

18. A cultivator comprising a frame, a plurality of units pivotally connected to said frame, cultivating tools carried by each of said units, a transverse rock shaft mounted on said frame, connections for connecting said units with said rock shaft, a relative removable draft member connected to said rock shaft, and a manually adjustable lever pivotally connected to said draft member and operatively connected to said frame for adjusting the relative position of said draft member with respect to said frame.

HERMAN E. ALTGELT.